United States Patent [19]

Cremer et al.

[11] Patent Number: 4,713,986
[45] Date of Patent: Dec. 22, 1987

[54] HINGE FITTING

[75] Inventors: Heinz P. Cremer; Harald Wolsiefer, both of Kaiserslautern; Manfred Hoffmann, Lohnsfeld; Elmar Deegener, Kaiserslautern; Günter Franzmann, Rockenhausen, all of Fed. Rep. of Germany

[73] Assignee: Keiper Recaro GmbH & Co., Fed. Rep. of Germany

[21] Appl. No.: 898,034

[22] Filed: Aug. 19, 1986

[30] Foreign Application Priority Data

Aug. 21, 1985 [DE] Fed. Rep. of Germany ....... 3529887

[51] Int. Cl.⁴ .............................................. F16H 1/28
[52] U.S. Cl. ...................................... 74/805; 297/362
[58] Field of Search ................... 74/804, 805; 297/362

[56] References Cited

U.S. PATENT DOCUMENTS

| 705,106 | 7/1902 | MacDonald | 74/801 |
|---|---|---|---|
| 3,146,638 | 9/1964 | Peras | 74/805 |
| 4,020,717 | 3/1977 | Johnson | 297/362 X |
| 4,143,912 | 3/1979 | Kramer | 297/362 |
| 4,181,357 | 1/1980 | Swenson et al. | 297/362 X |
| 4,453,767 | 6/1984 | Walk et al. | 297/362 |
| 4,469,375 | 9/1984 | Boyer | 74/805 X |
| 4,580,838 | 4/1986 | Schottker et al. | 297/362 |
| 4,621,543 | 11/1986 | Gabilondo | 74/805 |
| 4,629,251 | 12/1986 | Tezuka | 297/362 |

FOREIGN PATENT DOCUMENTS

| 2130873 | 1/1973 | Fed. Rep. of Germany | 297/362 |
|---|---|---|---|
| 3129672 | 10/1982 | Fed. Rep. of Germany | 297/362 |
| 1017865 | 5/1983 | U.S.S.R. | 74/804 |

Primary Examiner—Dirk Wright
Attorney, Agent, or Firm—Wigman & Cohen

[57] ABSTRACT

A hinge fitting for pivotably and selectively locking the back rest of a vehicle seat to the vehicle frame has two planetary gear sets, formed as mirror-images of one another. Both sets have the same reduction ratio and the eccentrics of the two planetary gear sets are rotated toward each other at most by a small angle.

13 Claims, 5 Drawing Figures

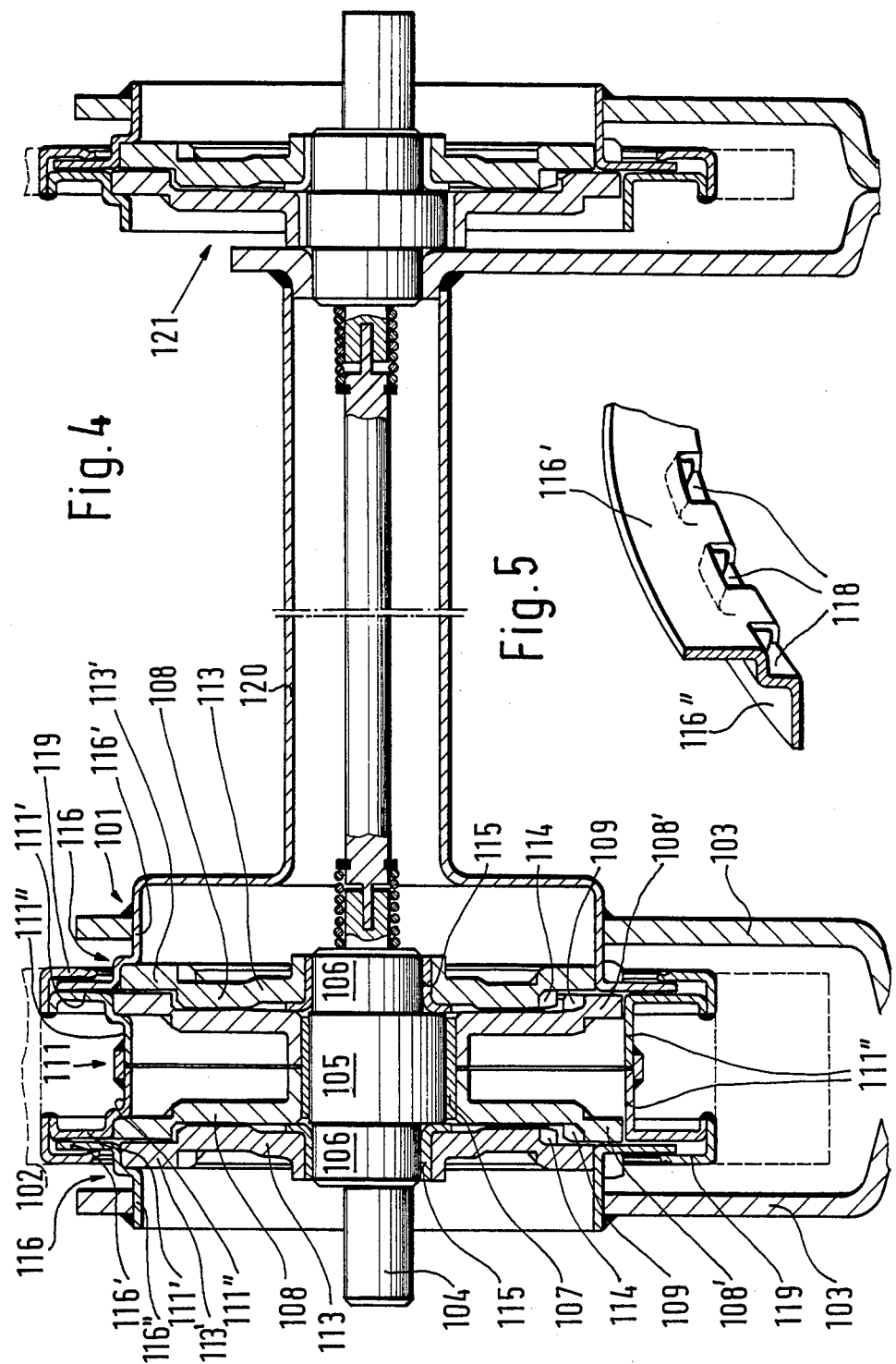

HINGE FITTING

BACKGROUND OF THE INVENTION

Field of the Invention

The invention relates to a hinge fitting to provide a pivotable and selectively lockable connection of the back rest of a vehicle seat to the seat frame thereof, and more particularly to a hinge fitting having a planetary gear set.

Description of the Prior Art

In known hinge fittings of this type, the width of the teeth on the gears of the planetary gearing are chosen to be larger as the torque to be borne by the hinge fitting increases. Since, as a rule, the gears of the planetary gearing are stamped parts, from which the teeth are pressed out in an axial direction, axial forces are applied through a deformation of the teeth, which tends to disengage the gears of the planetary gearing. Therefore, securing elements must be provided which resist these axial forces and hold the gears in engagement, all of which increases the expense of the construction of the hinge fitting.

SUMMARY OF THE INVENTION

The object of the invention is to create a hinge fitting of the above-described type, which is suitable for especially heavy loads, but which can be formed in an economical and space-saving manner. This object is achieved by providing a hinge fitting having two planetary gear sets, formed as mirror-images of one another. Both sets of planetary gears have the same reduction ratio, and the eccentrics of the planetary gear sets are rotated toward each other at most by a small angle.

The additional planetary gearing set makes it possible to select the tooth width significantly smaller, namely about half as large, as compared to a hinge fitting with only one set of planetary gearing. The material from which the gears are made can therefore be selected thinner, which significantly simplifies the establishment and maintenance of the necessary tolerances. This is particularly true when the teeth are pressed out of the material forming the gears. Furthermore, there is the fact that the mirror-image construction of the two planetary gearing sets can also compensate for axial force components that may appear. Accordingly, all of the securing elements which must assume the axial forces in the known hinge fittings can be eliminated. The elimination of these securing elements allows for a more compact structure. An additional significant advantage is the fact that the mounting pin can be kept free of forces tending to tip it laterally to its longitudinal axis. In this manner, elements can also be eliminated which must assume these loads on the mounting pin in the known hinge fittings. Furthermore, a tip-free loading of the mounting pin simplifies the design of the mount. It is also advantageous that all of the elements with teeth are rotationally symmetrical and therefore low in distortion, and are simple to produce and handle during manufacture and assembly.

Of course, it is possible when necessary, i.e., under extremely heavy loads, to form the hinge with more than one pair of symmetrically formed and arranged planetary gearing sets. Preferably, the corresponding elements of the two planetary gearing sets are formed identically and are arranged as mirror-images of each other, because costs can be saved in this manner.

In order to avoid having to align the two eccentrics with each other, in one preferred embodiment, the eccentrics of both planetary gearing sets are sections of the same eccentric. If the play in the teeth relative to the measurements is determined by the manufacturing tolerances, however, the tooth gears or tooth crowns of one planetary gearing set can be rotated slightly relative to each other compared to that of the certain other planetary gearing sets.

The axial spacing between the two planetary gearing sets depends on the desired width of the base for the introduction of force. The two planetary gearing sets can also be arranged immediately adjacent each other, for example, to achieve minimal space requirements.

In one preferred embodiment, the teeth of the two central gears are provided on the facing sides of the two rotationally connected supports arranged on the hinge pin, which supports form, either alone or together with other elements, one fitting element of the hinge. The two central gears then lie between these supports. It would also be possible, however, to arrange the supports forming the central gears between the two planetary gears, i.e., to arrange the teeth of the central gear on the sides of the support that do not face each other.

As is the case in one preferred embodiment, if the two supports carrying the central gears form one fitting element and the two planetary gears from the other fitting element, then the hinge fitting forms a structural unit which is very compact and can be incorporated into various designs.

Due to the fact that the mounting pin supporting the eccentric does not tip, both the supports and the planetary gears can be formed without hubs and can sit on mounting bushings. But even if each of the gears of the planetary gearing is provided with a hub, the expense can be kept low because these hubs can be formed on the gears, due to the relatively thin material from which the gears can be made. These hubs can then also fulfill the function of spacing bushings.

An economical and yet high load bearing connection between the gears of the planetary gearing and the structural elements which are capable of pivoting relative to each other and locked in selectable pivot positions, is obtained when both the central gear and the planetary gear meshing therewith are provided on their periphery with grooves and/or teeth, which engage with corresponding elements of the structural elements. These structural elements can be parts of a hinge fitting, or, for example, parts of the upholstery support of the back rest and parts of the seat frame of a vehicle seat. A direct connection between the upholstery support of the back rest and the seat frame saves a great deal of space and is cost effective.

The embodiment of these structural elements, with which the gears of the planetary gearing engage, can be formed in various ways. For example, at least one structural element can have a cylindrical bushing provided with openings for the engagement of the teeth provided on the periphery of the gears. This bushing can be formed in one or more pieces and can be set directly in the upholstery support of the back rest or the seat frame. Another advantageous possibility is to provide the structural element with a flange, with teeth projecting from its outer edge in an axial direction and engaging in the grooves of the associated gear. Furthermore, it is possible, for example, to design the structural element in such a manner that a flange is provided as an extension of a bushing-like section and the transitional area from the bushing-like section to the flange is provided with deformations which on one side of the structural element have the form of teeth and on the other side have the form of corresponding depressions.

If an asymmetrial load on the back rest will be the normal case, which occurs for example when the upper end of a three-point safety belt is attached to the back rest, one can provide a hinge fitting according to the invention on the more heavily loaded side and a known hinge fitting having only a single planetary gear set on the other side.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 4 is a longitudinal section of a second exemplary embodiment and of the hinge fitting provided on the other side of the seat, in its installed condition; and FIG. 5 is a partial and perspectively illustrated view of a structural element connecting the two central gears with the seat frame.

DETAILED DESCRIPTION OF THE PREFERRED EMBODIMENTS

Figure 1:
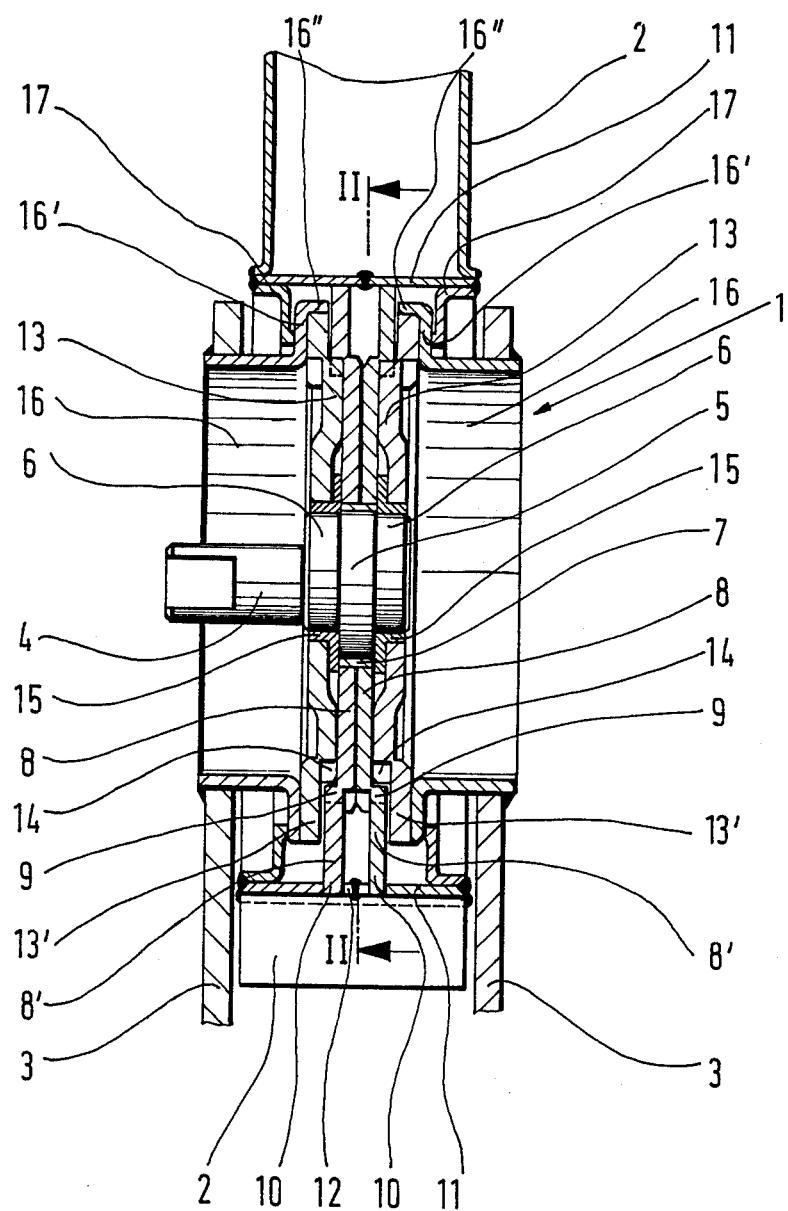
FIG. 1 is a longitudinal section of the first exemplary embodiment in its installed condition.

The hinge fitting designated generally with reference numeral 1 in FIG. 1 pivotably connects the back rest of a vehicle seat with the associated seat frame on one side of the seat in such a manner that it can be locked in a steplessly selectable pivotal position. A second hinge fitting, not shown, which can be identical or designed differently, provides the pivotable connection between the back rest and the seat frame on the other side of the seat. The upholstery support of the back rest, with which one side of each of the two hinge fittings is connected, in this exemplary embodiment has a hollow box-like connecting piece 2 laterally on its lower end, which connecting piece 2 can be the lower end section of respective side beams. The seat frame has two parallel, spaced plates 3 for the joining of the hinge fitting 1, which plates 3 are formed identically in the exemplary embodiment. The two plates in the exemplary embodiment are connected with each other only through the seat frame, but could also have a direct connection and, for example, could form the oppposite side walls of a hollow box-like bar.

The hinge fitting 1 includes a hinge pin 4, which is coupled with a hand wheel or a drive device. As shown in FIG. 1, the one end section of the hinge pin 4 carries an eccentric 6 on each side of a larger diameter, coaxially arranged section 5. The diameter of these two identical eccentrics 6 arranged at the same angle on the hinge pin 4 is selected in such a manner that the section 5 also extends somewhat over the eccentric 6 at the point of greatest eccentricity. In the exemplary embodiment the axial length of the section 5 and the two eccentrics 6 is equal; otherwise in the exemplary embodiment these elements are formed in one piece with the hinge pin 4.

A mounting bushing 7 is rotatably mounted on the section 5 that is coaxial to the hinge pin 4. This mounting bushing 7 is rigidly fixed in the central bore of two identical planetary gears 8 of two self-arresting, identically formed planetary gearing sets arranged as mirror-images of each other, with the gears 8 also arranged as mirror-images of each other. The two disc-like steel planetary gears 8 each have internal toothing 9 on the sides thereof facing opposite each other. The teeth of this internal toothing 9 are provided at the transition from the central area, where the two planetary gears contact one another, to an annular disc-like edge zone 8', because the toothing is produced by a corresponding deformation of the original material forming the planetary gear. The two annular disc-like edge zones 8', whose distance from each other is somewhat smaller than twice the thickness of the material, are provided with rectangular grooves along their outer periphery, which grooves form respective rectangular teeth 10 between them.

Figure 2:
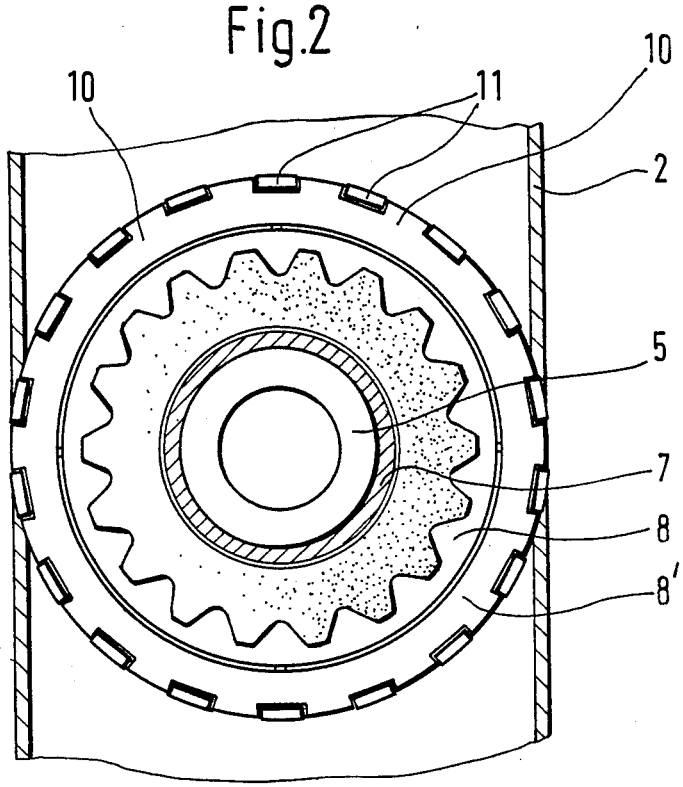
FIG. 2 is a section according to the line II—II in FIG. 1.

As shown in FIGS. 1 and 2, a tubular structural element 11 surrounds the two planetary gears 8. The tubular structural element 11 is rigidly connected with the connecting element 2, for example by welding, in such a manner that its longitudinal axis coincides with that of the hinge pin 4. The structural element 11, which for manufacturing reasons is comprised in the exemplary embodiment by two axially adjacent halves that are welded together, is provided with rectangular openings 12 in its central portion over the entire circumference. The dimensions of these rectangular openings 12 in the circumferential direction is adapted to the width of the teeth 10 measured in the circumferential direction, and the teeth 10 engage with no play in these openings 12. The separation of the structural element 11 makes it possible for the teeth 10 to be easily introduced into the openings 12 before the two parts are welded together. However, one could also, for example, form the structural element 11 by bending a band provided with openings 12. A division would then be avoided. The two planetary gears 8 are thus rigidly connected with the connecting element 2 by means of the structural element 11, and are thereby connected with the upholstery support of the back rest.

The two identical central gears 13 of the two planetary gearing sets each have an external toothing 14 on the sides that face each other. The internal toothing of the associated planetary gear 8 engages with this external toothing 14 of the respective central gears 13. The external toothing 14 is formed at the transition from a central zone axially displaced toward the associated planetary gear 8 to an annular disc-like edge zone 13' by a deformation of the material from which it is formed. The two central gears 13 are rotatably mounted on the respective eccentrics 6 by means of respective flange bushings 15, the flanges of which engage between the central gear 13 and the associated planetary gear 8.

Figure 3:
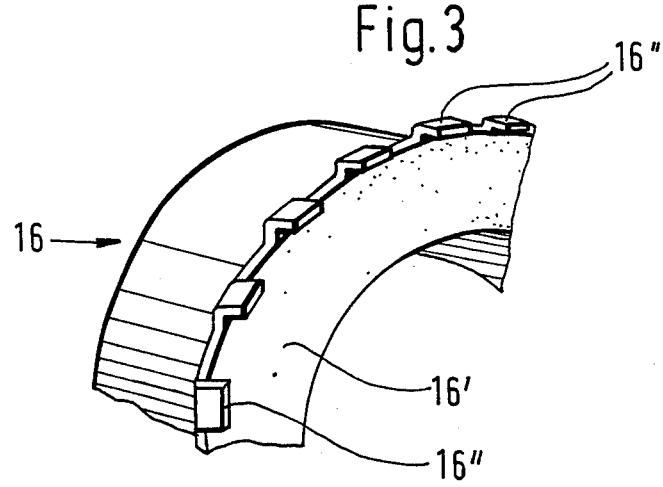
FIG. 3 is a partial and perspectively illustrated view of one of the two structural elements connecting the central gears with the seat frame.

Two flange bushing-like identical structural elements 16 are provided for the rigid connection of the two identical central gears 13, which are arranged as mirror-images of each other, with the respective plates 3. The cylindrical sections of these structural elements 16 are placed coaxially with the two eccentrics 6 in circular recesses in the plates 3 and are rigidly connected therewith. The flange element 16' of each of the two structural elements 16 lies on the outside of the annular disc-like edge zone 13' of the associated central gear 13. As shown in FIG. 3, the flange element 16' of each structural element 16 is provided with teeth 16" which project axially toward the associated planetary gear 8, the arrangement and dimensions of which are selected in such a manner that one tooth engages without play in one of the grooves which are provided along the outer edge of the edge zone 13'. The length of the teeth 16' is selected such that they are end spaced from the associated planetary gear 8. During assembly, the teeth 16" can be bent in a tool and are thereby introduced into the grooves of the central gear 13.

The hinge pin 4 is secured against any axial shifting relative to the gears of the two planetary gearing sets by the section 5, which projects radially over the two eccentrics 6. Also, the connecting element 2 cannot shift hinge pin 4 in an axial direction relative to the plates 3, because the two planetary gears 8 are arranged between the two central gears 13 without play. By means of the symmetrical arrangement and identical embodiment of the two planetary gearing sets, the planetary gear 8, which forms one hinge fitting and the central gear 13, which forms the other hinge fitting, any axial force components caused by the teeth are completely compensated. In addition, the hinge pin 4 is not subjected to any tipping loads. The forces and torques transferred by this hinge fitting are therefore very high despite a relatively small thickness of the gears and, therefore, the relatively small width of their teeth.

The second exemplary embodiment of the hinge fitting according to the invention illustrated at the left in FIG. 4 has basically the same construction as the exemplary embodiment according to FIGS. 1 through 3. The corresponding elements are therefore designated with reference numerals increased by 100.

The entire hinge fitting, designated with the numeral 101, pivotably connects the connecting element 102 of a back rest with the two parallel plates 103 of the seat frame, which are arranged adjacent to but spaced from each other.

The two identically formed planetary gearing sets, which are arranged as mirror-images of each other, each have a planetary gear 108 and a central gear 113. The mounting pin 104 common to both planetary gearing sets with the coaxial, larger diameter section 105 and the two eccentrics 106 is basically formed identically to the mounting pin 4. Only the axial length of the section 105 and the two eccentrics 106 is larger than in the first exemplary embodiment, because respective hubs are formed both on the two planetary gears 108 and on the two central gears 113. The hubs of the central gears 113 are located on respective flange bushings 115, the flanges of which engage between the central gears 113 and the associated planetary gears 108, and are rotatably mounted on the associated eccentric 106. The spacing of the two planetary gearing sets from each other as a result of the hubs of the planetary gears 108 is thus selected as large as the connecting element 102 will permit.

The two planetary gears 108 are provided with internal toothing 109 on the sides facing away from each other at the transition to an axially displaced, annular disc-like edge zone 108', which internal toothing 109 engages with external toothing 114 on the associated central gear 113. Also with the central gears 113 the toothing is provided at the transition to an axially displaced, annular disc-like edge zone 113'. The similarity to the first exemplary embodiment continues, in that the annular disc-like edge zones 108' and 113' of the gears of the two planetary gearing sets are provided with rectangular grooves along their periphery, with rectangular teeth being provided between said grooves.

The structural elements 111 and 116, which rigidly connect the planetary gears 108 with the connecting element 102 or the central gears 113 with the plates 103, essentially are formed identically. They namely have a bushing section 111" or 116" for each of the gears in the gearing set and an adjoining flange section 111' or 116'. The corner area at the transition from the bushing section to the flange section is provided with grooves 118 along the periphery, the width and arrangement of which are adapted to the teeth of the edge zone of that gear of the planetary gearing set with which a rotationally secured connection is to be established. The grooves 118 in the exemplary embodiment are formed in such a manner that the corner area has been deformed inwardly to form a tooth-like projection in the angle area between the flange section and the bushing section. Of course, it would also be possible to form the grooves and teeth of the structural elements 111 and 116, for example, as in the first exemplary embodiment, just as in reverse, with the strucutural element 16 of the first exemplary embodiment being formed in the manner of the structural element 116.

The bushing section 111" of the two structural elements 111, which are connected with the planetary gears 108, engage between the two annular disc-like edge zones 108' and are rigidly connected with each other in that area, for example, by being welded together. The flange section 111' lies with very little intermediate space adjacent the flange section 116' of the structural element 116, with which the associated central gear 113 is connected. The bushing section 116" of these two structural elements 116 are inserted into the recesses in one or the other of the plates 103 coaxially to the two eccentrics 106 and are rigidly connected with their associated plates. The rigid connection of the two planetary gears 108 with the connecting piece 102 is accomplished by means of the two structural elements 111, to which, in the exemplary embodiment, respective securing sheets 119 are welded. Securing sheets 119, together with the annular disc-like edge zone 108', forms a radially inwardly open slot in which the annular disc-like edge zone of the structural element 116 engages.

The method of operation of the hinge fitting and its characteristics are the same as in the hinge fitting according to FIGS. 1 through 3.

As shown in FIG. 4, the inwardly lying structural element 116 is formed in one piece with a tube 120, which is arranged concentrically to the longitudinal axis of the hinge pin 104 and extends to the opposite side of the seat, where it is rigidly connected with the seat frame, which, in this area, is also formed by a plate corresponding to the plate 103. The hinge fitting provided here, designated generally by numeral 121, is in principle formed like the outwardly lying planetary gearing set of the hinge fitting according to the invention, but could of course also have a different construction, including one according to the hinge fitting illustrated at the left in FIG. 4. For a forced synchronization of the two hinge fittings, the mounting pins thereof are coupled with each other by means of a torsionally stiff shaft.

Although only preferred embodiments are specifically illustrated and described herein, it will be appreciated that many modifications and variations of the present invention are possible in the light of the above teachings and within the purview of the appended claims without departing from the spirit and intended scope of the invention.

We claim:

1. A hinge fitting for a pivotable connection of the back rest of a vehicle seat with the seat frame or the seat rails in such a manner that the back rest can be locked in a selectable position, said hinge fitting being arranged between the back rest and a pair of spaced plates in said seat frame, comprising first and second fitting elements which are adapted to be pivotably connected with each other by a hinge pin and having a first planetary gearing set, the planetary gear of which is rotatably mounted on an eccentric supported by the hinge pin, said first planetary gearing set meshing with a crown gear forming a first central gear which is rigidly arranged on one fitting element, a second planetary gearing set which is formed as an identical mirror-image of said first planetary gear set relative to a plane perpendicular to the hinge axis, wherein said first and second planetary gearing sets have the same reduction ratio, and the eccentrics of the first and second planetary gearing sets are rotated toward each other at most by a small angle, means for supporting said first central gear and the second central gear around the entire periphery thereof, a structural element surrounding and connected with said first and second planetary gears, means connecting said first and second central gears with said spaced plates in said seat frame, wherein said means for supporting the first and second central gears around the entire periphery thereof is connected with said structural element and is located between said spaced plates in said seat frame.

2. A hinge fitting according to claim 1, wherein said first and second planetary gearing sets are formed as identical mirror-images.

3. A hinge fitting according to claim 1, wherein the eccentric of both planetary gearing sets are sections of one and the same eccentric.

4. A hinge fitting according to claim 1, wherein the teeth of the two central gears are provided on the facing sides of two axially displaced supports on one of the fitting elements, which supports are arranged on the mounting pin and are connected so as to rotate together.

5. A hinge fitting according to claim 4, wherein the two supports are formed identically.

6. A hinge fitting according to claim 4, wherein the two supports form one fitting element and the two planetary gears form the other fitting element.

7. A hinge fitting according to claim 5, wherein both the supports as well as the planetary gears sit on mounting bushings without hubs.

8. A hinge fitting according to claim 5, wherein each planetary gear is provided with a hub which extends toward the other planetary gear.

9. A hinge fitting according to claim 1, wherein said first and second central gears and said first and second planetary gears meshing therewith are provided with one of grooves and teeth on their peripheries, which grooves and teeth engage with corresponding elements of structural elements of said fitting which can be pivoted relative to each other and locked in selectable pivotal positions.

10. A hinge fitting according to claim 9, wherein the structural elements of said fitting are part of the upholstery support of the back rest and part of the seat frame or parts of structural groups rigidly connected therewith.

11. A hinge fitting according to claim 10, wherein at least one structural element includes a cylindrical bushing which is provided with openings for the engagement of the teeth provided on the periphery of the planetary gears.

12. A hinge fitting according to claim 10, wherein at least one structural element includes a flange with teeth projecting axially from its outer edge, which teeth engage in the grooves of the associated gear.

13. A hinge fitting according to claim 10, wherein at least one structural element has a flange adjoining a bushing-like section, and the transitional area from the bushing-like section to the flange is provided with deformations, which on one side of the structural element have the form of teeth and on the other side have the form of corresponding depressions.

* * * * *